No. 769,149. PATENTED SEPT. 6, 1904.
I. W. COLBURN.
GLASS WORKING MACHINE.
APPLICATION FILED MAR. 3, 1903.
NO MODEL. 5 SHEETS—SHEET 3.
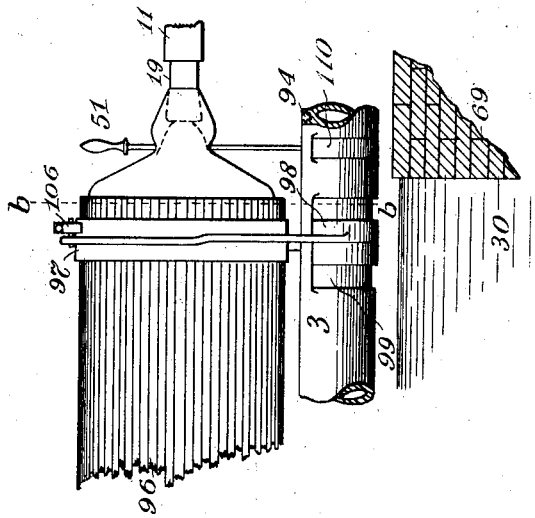
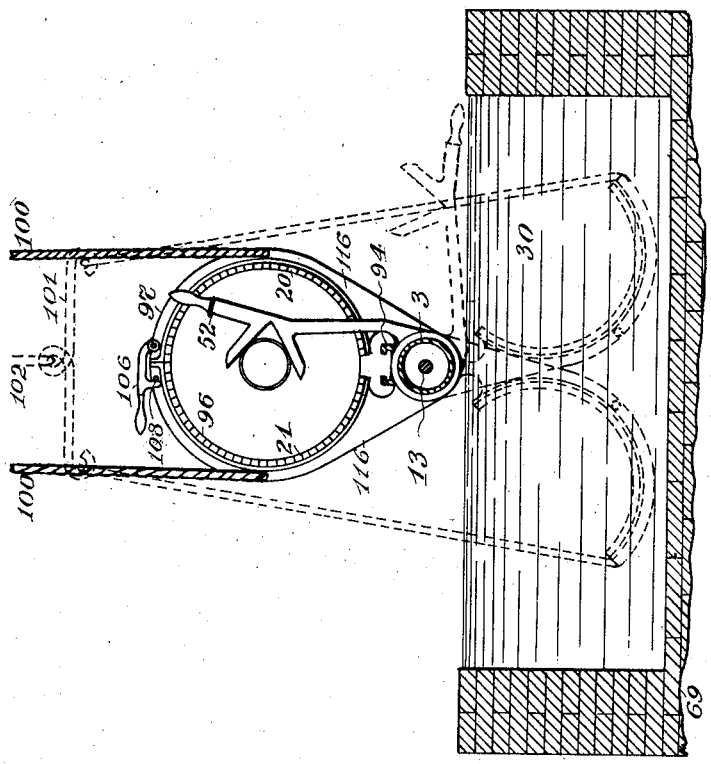
WITNESSES:
M. J. Dixon
W. R. Berry.
INVENTOR:
Irving W. Colburn,
BY Henry H. Bates.
ATTORNEY.

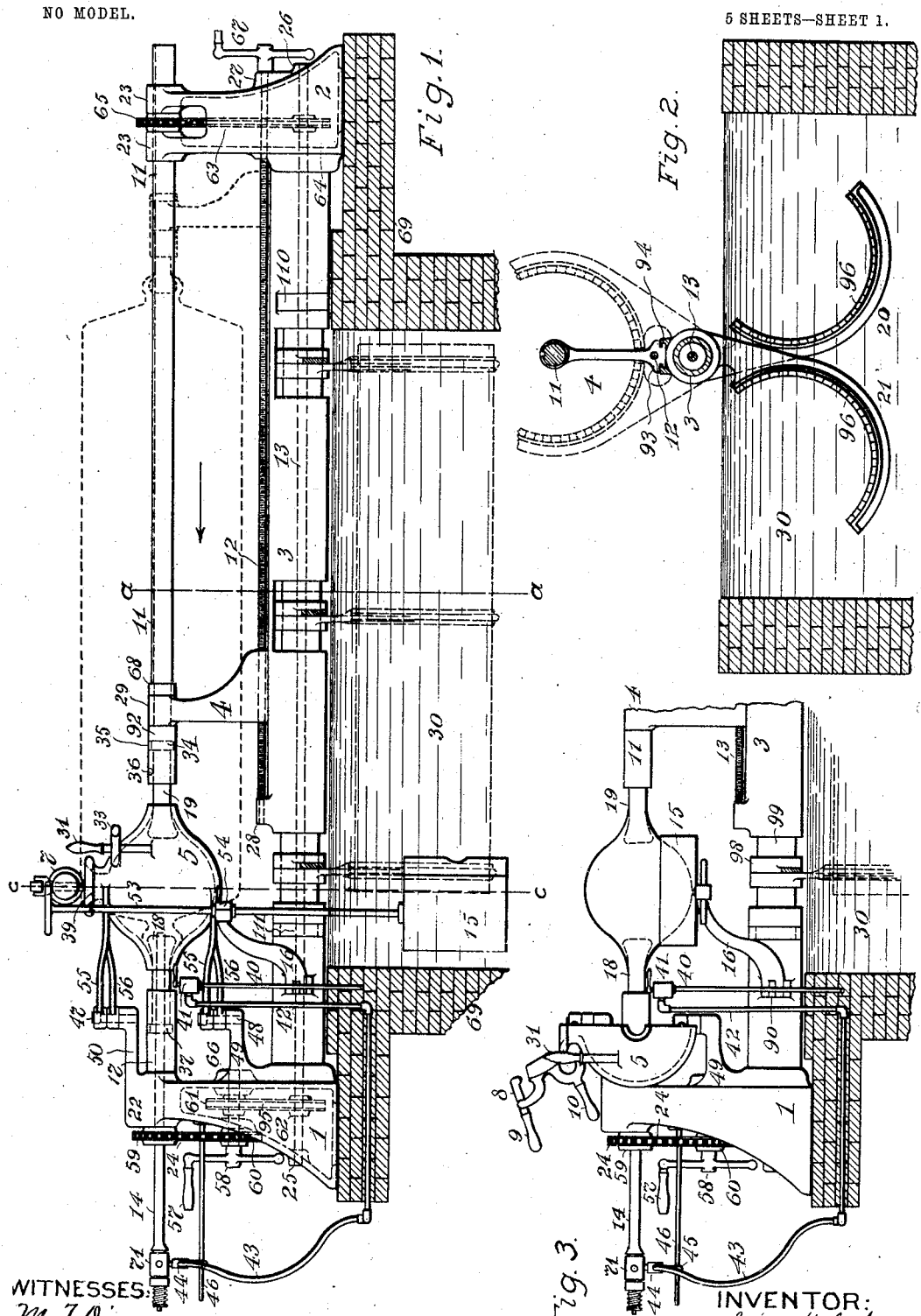

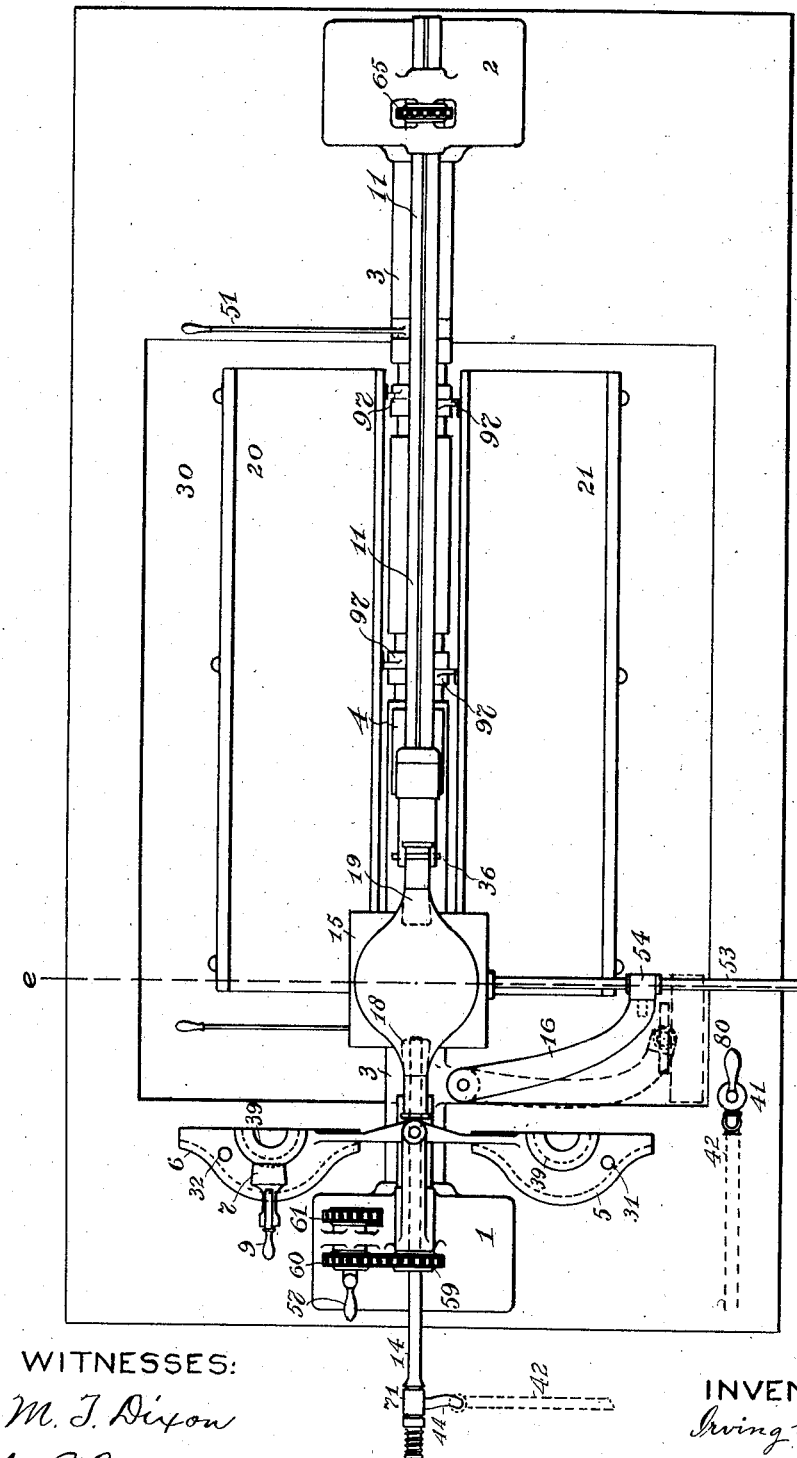

No. 769,149. PATENTED SEPT. 6, 1904.
I. W. COLBURN.
GLASS WORKING MACHINE.
APPLICATION FILED MAR. 3, 1903.
NO MODEL. 5 SHEETS—SHEET 4.

WITNESSES:
M. T. Dixon
W. R. Berry.

INVENTOR:
Irving W. Colburn
BY Henry H. Bates,
ATTORNEY.

No. 769,149. PATENTED SEPT. 6, 1904.
I. W. COLBURN.
GLASS WORKING MACHINE.
APPLICATION FILED MAR. 3, 1903.
NO MODEL. 5 SHEETS—SHEET 5.
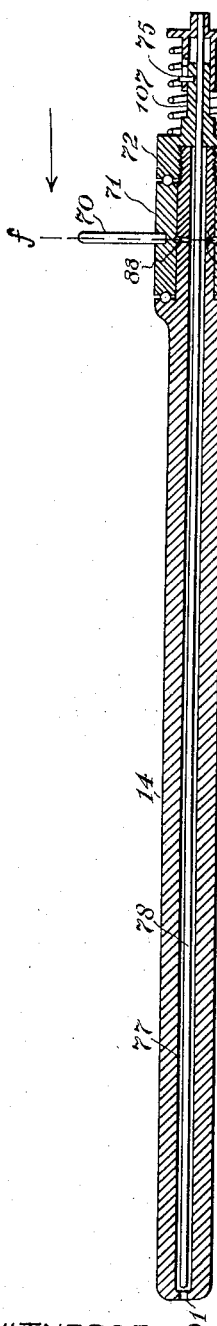
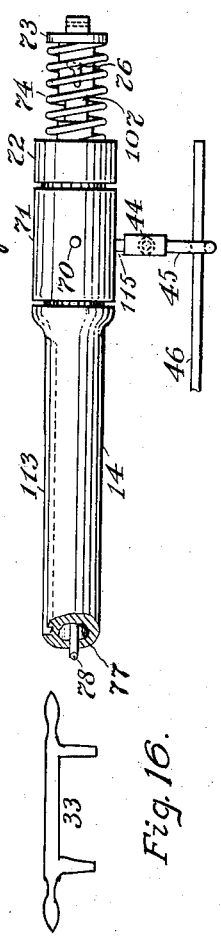
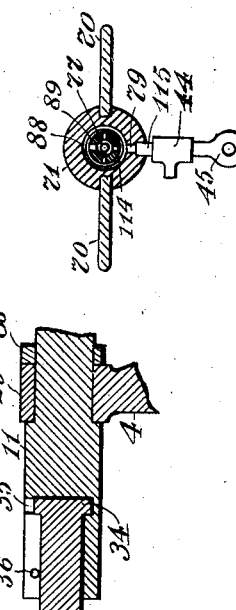
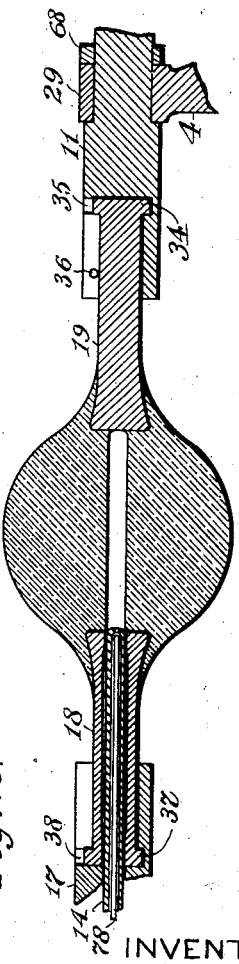
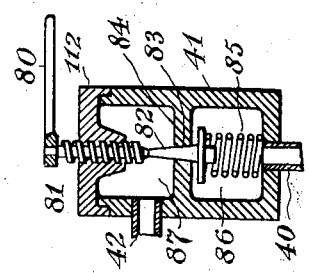
WITNESSES:
M. J. Dixon
W. R. Berry
INVENTOR:
Irving W. Colburn,
BY Henry H. Bates,
ATTORNEY.

No. 769,149.

Patented September 6, 1904.

UNITED STATES PATENT OFFICE.

IRVING W. COLBURN, OF FRANKLIN, PENNSYLVANIA.

GLASS-WORKING MACHINE.

SPECIFICATION forming part of Letters Patent No. 769,149, dated September 6, 1904.

Application filed March 3, 1903. Serial No. 145,880. (No model.)

*To all whom it may concern:*

Be it known that I, IRVING W. COLBURN, a citizen of the United States, residing at Franklin, in the county of Venango and State of Pennsylvania, have invented certain new and useful Improvements in Glass-Working Machines, of which the following is a specification.

My invention relates to a novel means or apparatus for producing articles of glass.

The object is to furnish a machine that will enable the operator to manufacture cylinders of large size and brilliant surface adapted to be cut off at the ends, slit open, and flattened out into sheets suitable for window-glass.

The machine is also adapted to the formation of cylindrical and spheroidal receptacles of large size by suitable manipulation.

Figure 8:
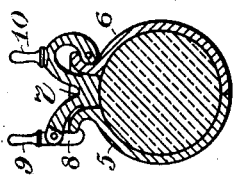
Figure 9:
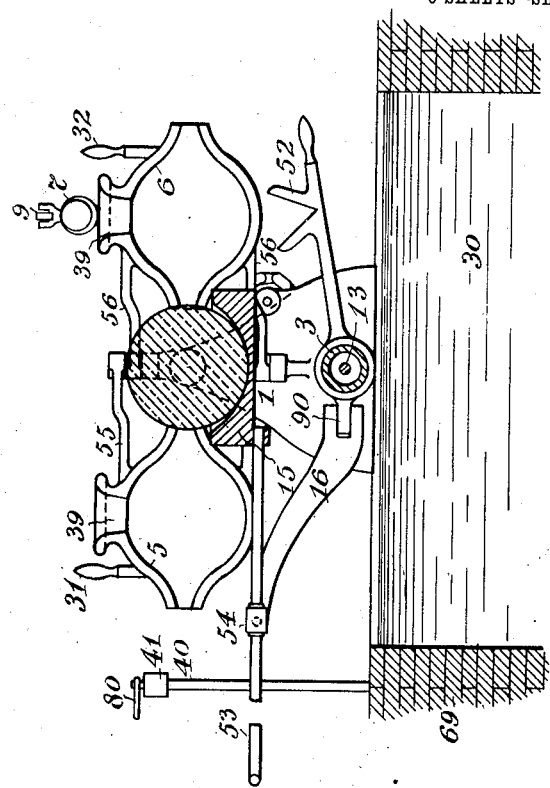
Figure 7:
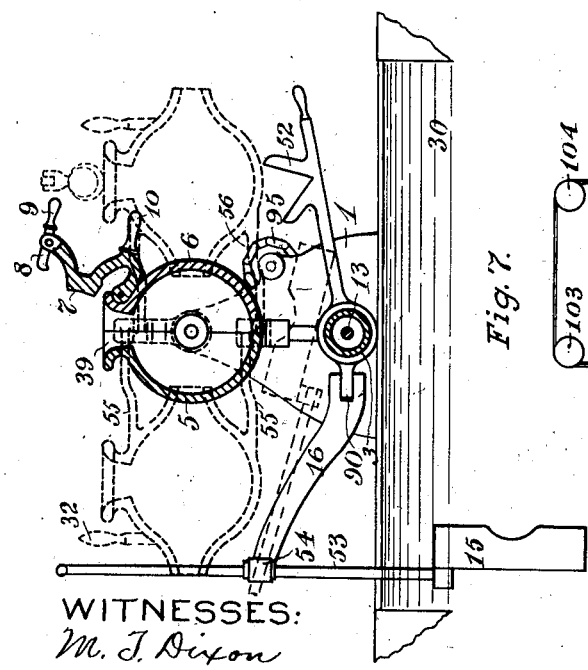
Figure 15:
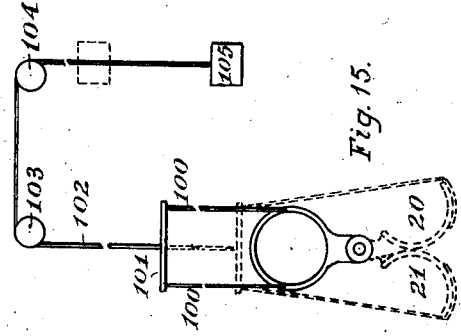

In the drawings forming a part of this specification, Figure 1 is a front elevation of the machine, showing a water-tank in section. Fig. 2 is a transverse section taken on line $a\ a$, Fig. 1. Fig. 3 is a partial front elevation, showing an open mold and modeling-block in place. Fig. 4 is a plan view. Fig. 5 is an end elevation sectioned on line $b\ b$, Fig. 6. Fig. 6 is a partial front elevation showing slickers in place and cutting-down forks. Fig. 7 is a transverse section on line $c\ c$, Fig. 1, showing closed mold with open mouth. Fig. 8 is a transverse section of closed mold filled. Fig. 9 is a transverse section on line $e\ e$, Fig. 4. Fig. 10 is a horizontal section of plunger. Fig. 11 is a partial side elevation of plunger. Fig. 12 is a transverse section of plunger on line $f\ f$, Fig. 10. Fig. 13 is a vertical section of air-regulating valve. Fig. 14 is a longitudinal section of holding-heads and plastic-glass casting. Fig. 15 is a diagram showing the means for closing the slickers. Fig. 16 is a view of the mold-clamp.

Referring to the drawings, 1 and 2 are upright stationary pedestals and housings, preferably on a masonry base 69, at a suitable distance apart for conducting the operation of forming the glass article, and between them is located the depressed water-tank 30. The housings are tied together by a bridge-rail 3, bridging the water-space. On housing 1, which serves as a head-stock for the apparatus, are secured or integrally formed the brackets 49 50, on which are pivoted, by means of arms 55 55 56 56, the respective members 5 and 6 of the divided mold, whereby said mold members are adapted to be swung apart laterally, and thus removed from the casting in the position illustrated in Figs. 3, 4, and 9. Said mold members, preferably forming equal halves of the mold, are made of any suitable material, preferably metal, highly polished on their interior surfaces to obviate adhesion of the glass thereto, and are provided with handles 31 32, by which the mold can be conveniently opened and closed. A clamp 33 is provided embracing said handles for the purpose of securely locking the mold against internal pressure when closed and filled. Said mold may be of any suitable shape interiorly, the one shown being ellipsoidal, and has a mouth or aperture 39 in its top when closed provided for filling purposes and a lid or cover 7, fitting said mouth, pivotally secured to one of the mold members and furnished with a handle 10, by which said lid can be manipulated. A locking-lever 9, with hook 8, is pivoted to the lid opposite to the handle and engages with a projecting lug or flange on the opposite mold member to secure the lid against displacement by internal pressure. In the ends of the mold when closed are openings into which project holding-heads for plastic glass 18 19. These holding-heads are made, preferably, of metal, round with expanded ends, the latter roughened on their surfaces to secure adhesion of the plastic glass. They are detachably secured to rotatory spindles 17 11 by means of square lugs 37 34, fitting recesses 38 35, respectively, in said rotatory spindles, secured therein as to spindle 11 by a pin 36, and as to spindle 17 by means hereinafter described. Said spindles are in axial alinement. Spindle 17 is held in bearing 22 on housing 1, and spindle 11 is held in bearings 23 on housing 2. Within spindle 17 and holding-head 18 is axially located a tubular plunger 14, splined within said spindle so as to be longitudinally movable therein and through the holding-head, and yet rotate with them. Said plunger has handles 70 on its sleeve 71, by which it can be moved in and out and made to axially penetrate the plastic casting held between the holding-heads. It is smooth and polished on its exterior surface and has a terminal aperture 91 somewhat smaller than the bore of the plunger. Within the plunger is a rod 78 for stopping and unstopping this aperture, being connected with an end piece 73, sliding upon a projection 107 on cap 72 on the outer extremity of the plunger. This end piece has an L-shaped slot 76 engaged by a pin 75, made fast in projection 107 on cap 72. There is also a spring 74 under compression between cap 72 and end piece 73, which tends to keep rod 78 out of aperture 91; but by pushing the end piece and turning it so as to engage the pin with the angular branch of slot 76 the rod 78 can be made to stop aperture 91 and be retained in place. This is for the purpose of preventing the plastic glass from entering the tubular plunger when the latter is forcibly thrust into the mass. The passage 77 in the plunger is for conducting air under compression to the interior of the plastic casting after it has been perforated by said plunger. To this end there is a sleeve 71 on the outer end of the plunger secured by cap 72. The handles 70 for operating the plunger are secured to this sleeve. Within the sleeve are channels 88 opposite to annular grooves 89 in the plunger, and these latter communicate by perforations 114 with the passage 77 in the plunger. Channels 88 in the sleeve communicate by passage 79 and nipple 115 with T-coupling 44, to which is connected the flexible air-conduit 43, leading from air-pipe 42, air-valve 41, and air-pipe 40, which are in communication with the compressed-air supply. The sleeve 71 is prevented from rotating with the rotatory element 14, on which it is mounted, by an eye 45, connected to T-coupling 44 in movable engagement with a fixed rod 46 parallel with the line of movement of the plunger. Said movable plunger passing entirely through both rotatory spindle 17 and tubular holding-head 18 forms an effectual lock for the latter when the plunger is pushed in, but enables the holding-head to be lifted out of its socket when the plunger is withdrawn.

The spindles 17 11, with their respective holding-heads 18 19, are caused to rotate in unison by the following means: Fast on spindle 17 is a sprocket 59, connected by chain-gearing 24 with a sprocket 60, fast on shaft 58, borne in bearings 66 in housing 1. Said shaft 58 is operated by crank 57. On said shaft 58 is also mounted a sprocket 61, geared by chain gearing 95 with sprocket 62 on a shaft 13, borne in bearings 25 26 on housings 1 and 2, respectively. On said shaft 13 in housing 2 is mounted a sprocket 64, connected by a chain gear 63 with sprocket 65, splined on spindle 11, held in bearings 23 on housing 2, so as to be rotated by said sprocket 65 while permitted to move longitudinally through it. The gearing between shaft 13 and the respective spindles 17 and 11 being in the same ratio at both ends of said shaft, said spindles, with their respective holding-heads 18 19, rotate in unison in either direction as actuated by the operation of crank 57 at any desired speed or variation of speed.

Mounted on the bridge-rail 3 is the movable tail-stock 4, traversing longitudinally thereon, guided by ways 94 on said rail, which are engaged by feet 93 on the tail-stock. The latter is actuated back and forth by means of a screw 12, mounted parallel with ways 94 in bearing 28 on the bridge-rail and 27 in housing 2. Said screw is threaded into the tail-stock and is operated by crank 67 in either direction. The function of the tail-stock is to move and draw the holding-head 19 with its attached glass. To this end spindle 11 passes rotatively through it in bearing 29, being held in place by shoulder 92 and collar 68 fast on the spindle. As the tail-stock and spindle thus move together the latter moves back and forth in its bearings 23 while rotating.

Auxiliary to the rotating, drawing, and expanding means is the modeling-block 15, the function of which is to smooth, shape, marver, and form the mass of plastic glass while rotating and expanding. This block may be made either of wood or metal, but in either case requires to have its contacting surface properly treated and prepared. If of wood, the block is kept wet and cool by immersion in the tank when not in use, and its surface is made smooth for use by some suitable lubricant. If of iron, the surface is also suitably prepared and the metal raised to a non-chilling temperature before use. The block is manipulated and pressure applied to the glass by means of a handle 53, loosely mounted in a trunnion-block 54, trunnioned on lever-arm 16, which is pivoted on bracket 90, thus permitting to the block 15 free motion in three directions—namely, a turning motion, an up-and-down motion, and a motion lengthwise of the machine.

In Figs. 2, 5, and 6 is illustrated another auxiliary device important in the finishing of the glass product. 20 21 are slickers the internal surfaces of which when closed upon the glass under treatment form portions of a true cylinder. They can be made of wood or metal. If of metal, the contacting surfaces are paste-covered. As shown in the illustrations, they are made of strips of green wood 96, Fig. 6, which are water-soaked and kept moist in the tank below when not in use. They are secured to metal hoop-sections 97, so arranged as to open and close upon the glass article. In the drawings they are shown divided into two equal sections; but I do not limit myself to two parts, since so long as the slickers when closed upon the glass article form a perfect cylinder interiorly it is immaterial into how many parts they are divided. As shown, the metal supporting hoop-sections 97 are carried on arms 116, provided with bearings 98, journaled on cylindrical portions 99, formed on the bridge-rail 3, which forms a pivot for said arms, on which they are both free to turn and to be moved back and forth lengthwise of the bridge-rail. This linear motion, which is given by the hand of the operator, is for the purpose of preventing the glass, which expands first in the middle, from chafing and wearing a ring around the center of the cylinder of wood strips; also, to avoid any scratches or ridges which might be produced in the glass surface if it followed constantly the same annular path. The slickers go into the water immediately on leaving the glass, the tank being located conveniently beneath for that purpose. The mechanism for opening and closing the slickers is shown in Figs. 5 and 15. The dotted lines show the position of the slickers when in the water. The full lines show them in the raised and closed position. 106 is a lock pivoted to one of the hoop-sections and engaging with a pin 108 on the opposite section. To raise them, ropes or chains 100 are provided attached to the hoop-sections below and to a spreader-bar 101 above, from which bar a rope 102 passes upward over sheaves 103 104 to a counterweight 105. The slickers may be operated by pulling on the counterweight.

51 52 are cutting-down forks for forming a neck or narrow place on the rotating glass at a point of detachment. They are pivoted edged lever-arms working against the surface of the plastic glass and are not limited to the precise form and construction shown. One of the working edges can be used as a knife. They are journaled on the bridge-rail by revoluble bearings 110 111, one at each end of the glass cylinder.

41 is an air-regulating valve for controlling the quantity or volume of air admitted to the glass to be expanded.

81 is the valve-stem screw-threaded into the cap 112, made fast on the valve-case. It is controlled by handle 80 and impinges on conical valve 82, fitting in a ground seat 83 in diaphragm 84. Said valve is pressed to its seat by compression-spring 85 in chamber 86. Air under pressure reaches chamber 86 through pipe 40. It then finds exit in variable amount through variable aperture 83 as the opening is varied by the advance and retraction of stem 81, controlled by handle 80, and thence passes through pipes 42 43 to T-coupling 44 and the plunger and thence into the mass of plastic glass.

Operation: Taking the machine at rest, with the parts in the position shown in Fig. 1, the mold members having been previously heated to a temperature suitable for the casting of molten or plastic glass, so as not to chill the casting too much, on the one hand, or to cause it to adhere to the metal surfaces, on the other, the mold is clamped so as to hold the members securely together. The lid is open, the holding-heads are within the end apertures of the mold, the plunger in place, as shown in Fig. 1, whereby the holding-head 18 is locked in place, and holding-head 19 is locked in place by pin 36. The tank is filled with water. The cut-down forks are in the position shown in Figs. 7 and 9. The air-regulating valve is closed. Molten glass is now brought to the machine by any of the appliances usually employed for handling melted glass from glass-furnaces, and a sufficient charge is poured into the closed mold through aperture 39. The said charge immediately adheres to the roughened surface of the holding-heads, but not to the polished surface of the interior of the mold. The lid is now closed and locked in position, the glass is allowed to stand a few seconds to chill around the holding-heads and secure firm adhesion, and the operator then rotates screw 12, so as to advance the holding-head 19 into the mass of plastic glass, whereby pressure is applied throughout the entire mass, causing it to fill and fit the mold and take its exact shape. The casting does not flow out at the ends by reason of the close fit of the holding-heads to the mold-apertures and being thin at the places around the holding-heads by reason of the shape of the mold soon chills and makes a firm adhesion to the latter, and thus aids in securing the desired pressure. The lid is now unlocked and raised, the locking-clamp is removed, the mold members are swung apart, and the holding-heads are started into simultaneous rotation by the means described, carrying the plastic casting with them. The marvering-block previously prepared is now brought into operation and applied by hand to the rotating surface of the mass in a way prescribed by experience to produce the desired results, the object being to block out seams and unevenness, to marver the glass into proper shape and consistency, and to distribute the heat evenly throughout the plastic mass. The operator of the rotatory mechanism at this time cooperates with the manipulator of the marvering-block both as to the required speed and direction of rotation, which needs to be judiciously varied and to be reversed in case of twisting of the plastic mass. During the blocking operation or just before or just after the plunger is forced into and through the plastic mass to make the required perforation. The plug-rod is then withdrawn while rotating by releasing its spring 74, and immediately afterward the plunger is drawn back by handles 70, leaving a cylindrical aperture through the center of the plastic mass. Air under pressure is now admitted to the interior of the glass through the plunger by manipulating the air-regulating valve, which starts the mass into expansion. If the expansion is even, the block is withdrawn and the expansion continued; but if the expansion is uneven the air-pressure is cut off and the blocking is continued. The use of the block is at all times a matter of judgment and is not automatic. The flow of air is also varied according to judgment by means of the handle, which regulates the quantity of air passing. The movable tail-stock is meantime started into operation to draw and extend the mass as it expands and gets thinner in its walls. If the expansion proceeds evenly, the slickers are brought into operation, locked above the rotating object, and kept moving to and fro lengthwise continuously until the cylinder assumes the proper form and diameter, the size being governed by the interior diameter of the slickers and the permanent form fixed by the final chill of contact with the slicker-surfaces. During the latter part of this operation, just before or just after the removal of the slickers, according to the condition of the plastic glass or the convenience of the operator, the cutting-down forks are brought into operation by forcing them against the ends of the cylinder in the manner illustrated in Figs. 5 and 6. Any form of implement operating substantially in this way is within the scope of this part of the invention. The object is to so shape the necks on the glass as to facilitate the detachment of the cylinders from the holding-heads by cracking off at that point in any of the well-known methods. Before cracking off the flow of air is of course shut off and the slickers are removed from their position around the glass article. The completed cylinder after being cracked off is carefully removed from the machine, and the holding-heads are then unlocked and removed and cleared of the adhering glass.

I claim and desire to secure by Letters Patent—

1. A divided mold, the members whereof are pivoted to swing horizontally, for opening and closing the mold, a filling-aperture on top of the mold, open end apertures, and means for closing said filling and end apertures to withstand internal pressure.

2. A divided mold, the members whereof are pivoted to swing horizontally, for opening and closing the mold, means for locking the mold, a filling-aperture on top, openings in the opposite ends of the mold, and rotatory holding-heads for plastic glass, in axial alinement, accurately fitted to said end openings for closing the same when the mold is closed and locked for casting.

3. A divided mold, the members whereof are pivoted to swing horizontally, for opening and closing the mold, end openings in said mold when closed, two rotatory holding-heads for plastic glass, in axial alinement, projecting within and fitting the said end openings of the closed mold, means for moving lengthwise one of said holding-heads, and curved necks on the apertured mold surrounding said holding-heads, whereby a thin shell of chilled glass is formed.

4. Two rotatory holding-heads for plastic glass in axial alinement, means for casting a mass of plastic glass between and in secure adhesion to said holding-heads, means for rotating the holding-heads and glass in unison in either direction, a main frame, marvering-block, pivoted to the main frame by jointed connections, and means for manually pressing the block against the rotating surface of the glass for marvering the same, substantially as specified.

5. A main frame, an arm 16 pivoted to said main frame, a trunnioned block mounted upon said arm, a lever-handle loosely held in said trunnion-block, and a marvering-block, having a concave surface suitably prepared and treated for application to the rotating surface of the glass article under formation.

6. Two rotary holding-heads in axial alinement, means for casting a mass of plastic glass between and in secure adhesion to said holding-heads, means for rotating the holding-heads and contained glass in unison in either direction, and a slicker, cylindrical on its inner surface, its inner surface being coated with a lubricant for application to the rotating mass of plastic glass treated in the machine, to bring said glass to a true cylindrical contour.

7. A divided slicker, cylindrical on its inner surface when closed, means for opening said slicker to admit the rotatory mass of glass under treatment, and for closing and locking the same upon said mass of glass, and means for moving said slicker to and fro lengthwise.

8. A divided slicker, composed of two pivoted members swinging open vertically, cylindrical on its inner surface when closed, means for opening, closing and locking said members upon a rotatory mass of plastic glass held in the machine, and means for moving said slicker to and fro lengthwise.

9. A divided cylindrical slicker for treating plastic glass, consisting of members each formed of wooden slats arranged parallel, said members being movably mounted to open and close and be locked around a rotatory mass of plastic glass, and means for moving said closed slicker longitudinally back and forth.

10. Two stationary housings, a bridge-rail connecting said housings, a water-tank beneath the bridge-rail, cylindrical bearings on said bridge-rail, a slicker movably mounted on said bearings, cylindrical on its inner surface, and composed of divided members, pivoted to open, close and be locked, and means for lowering said members into said water-tank, and for simultaneously raising and closing said members.

11. A slicker for plastic glass, cylindrical on its inner surface composed of two members made of parallel wooden slats, secured to hoop-sections, pivoted to swing vertically, said hoop-sections journaled loosely on a bearing parallel with the axis of the slicker, and movable lengthwise on said bearing, means for raising and lowering said slicker members, and means for locking the same when closed.

12. Two rotatory holding-heads for plastic glass in axial alinement, means for casting a mass of plastic glass between and in secure adhesion to said holding-heads, means for rotating said heads and glass in unison in either direction, means for expanding said glass by interior pressure while rotating, means for extending said glass while rotating and expanding, means for shaping and marvering said glass and for reducing it to a true cylindrical form while rotating, and means for forming contracted necks on said glass article, near the holding-heads, to enable the article to be cracked off at such points and be conveniently removed from the holding-heads and the machine.

13. Two rotatory holding-heads for plastic glass in axial alinement, means for casting a mass of plastic glass between and in secure adhesion to said holding-heads, means for rotating, expanding, marvering, drawing and shaping said plastic mass, and edged lever-arms pivoted on bearings, one at each end of the rotatory glass article, whereby they can be brought against the rotating mass near the holding-heads to form constricted places or necks to facilitate the cracking off of the completed article from the holding-heads, and its removal from the machine.

14. Two stationary housings, a bridge-rail connecting said housings, parallel ways on said bridge-rail, two rotatory spindles held in bearings on said housings in axial alinement, one longitudinally fixed, and one movable, but revoluble in its bearings, mechanism for rotating said spindles in unison in either direction, supported in and upon said housings, detachable holding-heads for plastic glass carried by said spindles, a movable tail-stock mounted on said ways, in which said movable spindle is loosely journaled, means for moving the tail-stock back and forth on said ways, and collars on said movable spindle, one on each side of the tail-stock, whereby said spindle is moved lengthwise back and forth by the movements of the tail-stock.

15. Two rotatory holding-heads for plastic glass in axial alinement, means for casting a mass of plastic glass between and in secure adhesion to said holding-heads, means for rotating said holding-heads and glass in unison in either direction, a hollow movable plunger for piercing the rotatory mass of glass and for conveying air to the pierced interior, means connected with the plunger for supplying compressed air to said plunger, a valve for regulating the quantity of the air thus supplied, and a hand-lever for manually operating said valve.

16. Two rotatory holding-heads for plastic glass in axial alinement, means for casting a mass of plastic glass between and in secure adhesion to said holding-heads, means for rotating said holding-heads and glass in unison in either direction, means for conveying compressed air to the interior of the rotatory mass of glass, and a hand-operated valve for controlling the quantity of air supplied to the glass, consisting of a casing, an inlet and an outlet for compressed air in said casing, a perforated diaphragm in said casing, the perforation forming a valve-seat, a spring-pressed conical valve engaging said valve-seat, a screw-stem engaging said valve to open and close the same in variable degree, and a hand-lever for operating said screw-stem.

17. Two rotatory holding-heads for plastic glass in axial alinement, one fixed, and the other movable lengthwise, means for casting a mass of plastic glass between and in secure adhesion to said holding-heads, means for rotating said holding-heads and glass in unison in either direction, a hollow plunger having a terminal aperture, axially located within and passing through said fixed holding-head, rotating with the same, means for moving said plunger lengthwise in and through said holding-head, back and forth, while rotating, means for supplying compressed air in variable quantity to and through the plunger, and means for stopping and unstopping the terminal aperture of the plunger, substantially as specified.

18. Two rotatory spindles in axial alinement, one fixed and the other movable lengthwise, rotatory holding-heads for plastic glass detachably held in said spindles, means for rotating said spindles and holding-heads in unison in either direction, means for casting a mass of plastic glass between and in secure adhesion to said holding-heads, a hollow plunger having a terminal aperture smaller than the bore of the plunger axially held in and passing through said fixed spindle and its holding-head, and rotating therewith, means for moving said plunger lengthwise to and fro in and through the spindle and holding-head while rotating, means for passing compressed air in variable quantity through said plunger while rotating, a rod loosely contained in the bore of the plunger, fitting its terminal aperture, and means for manipulating said rod to stop and unstop said terminal aperture at will while the plunger is rotating.

19. Two rotatory holding-heads for plastic glass in axial alinement, means for rotating said holding-heads in unison in either direction, a hollow plunger in one of said holding-heads, rotating therewith, and movable lengthwise in and through said holding-head, a terminal aperture in said plunger, smaller than the bore of the plunger, a cap on the outer end of the plunger, an end piece on said cap, movably mounted thereon, a spring between said cap and end piece, a rod connected to the end piece, extending through the bore of the plunger, for stopping and unstopping the terminal aperture, an L-shaped slot on the end piece, and a pin on the cap in engagement with said L-shaped slot, for locking the rod in engagement with the terminal aperture.

20. Two rotatory holding-heads for plastic glass in axial alinement, means for rotating said holding-heads in unison in either direction, a hollow plunger in one of said holding-heads, rotating therewith, and movable lengthwise therein, a sleeve held between collars fixed on the outer extremity of said plunger, means for holding said sleeve against rotation with the plunger, handles on said sleeve for moving the plunger lengthwise, annular grooves or channels within the sleeve and on the plunger in proximity, apertures through the plunger connecting said channels with the bore of the plunger, a nipple in the sleeve communicating with said annular grooves or channels, and a coupling connected to said nipple to form communication between the plunger and a supply of compressed air.

21. Two stationary pedestals and housings, a bridge-rail connecting the same, parallel ways on said bridge-rail, a tail-stock traversing on said ways, between the two housings, means for moving said tail-stock back and forth, rotatory spindles in axial alinement held in bearings on said housings, one fixed, the other movable, the movable spindle loosely held in a bearing on the movable tail-stock and collared to said bearing, a rotatory shaft extending between said housings and borne in bearings therein respectively, means for rotating said shaft in either direction, geared connection between said rotatory shaft and the fixed spindle, geared and splined connection between said rotatory shaft and said movable spindle, whereby the latter is rotated while longitudinally movable, holding-heads for plastic glass detachably held in said spindles, in axial alinement, a movable rotatory hollow plunger splined in the fixed rotatory spindle, passing axially through its holding-head, an air-passage in said plunger, with terminal aperture, means for opening and closing said terminal aperture from the outside, a non-rotative sleeve loosely mounted on said rotatory plunger, an air-pipe connected to said sleeve, communicating with the air-passage of the plunger, an air-regulating valve for manually controlling the quantity of air delivered through the plunger, a divided mold for casting a mass of plastic glass between and around said holding-heads, a means for thrusting the plunger centrally into the rotatory mass of plastic glass, means for opening, closing and locking the mold against internal pressure, means for exerting pressure upon the locked contents of the mold, means for marvering and smoothing the rotatory casting, and a jacket-slicker of cylindrical form for forming the article to finished shape, while surrounding said article during rotation.

In testimony whereof I have signed my name to this specification in presence of two witnesses.

IRVING W. COLBURN.

Witnesses:
 FRED. D. OILER,
 ROBT. F. GLENN.